Figure 3:
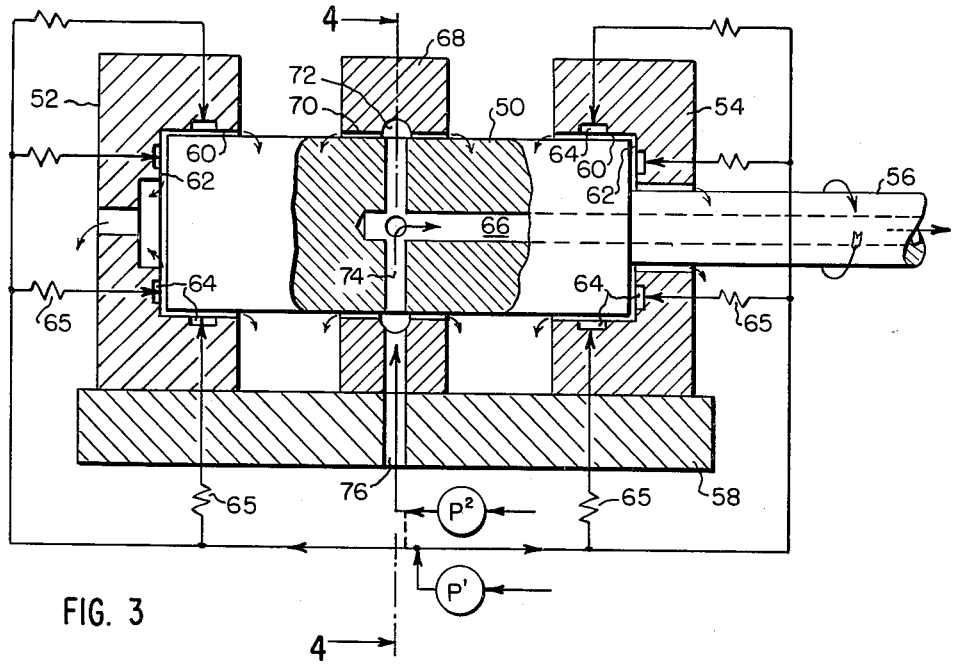

Oct. 24, 1961 C. S. MORSER ET AL 3,005,666
HYDROSTATIC ROTARY COUPLING
Filed July 6, 1959 3 Sheets-Sheet 1
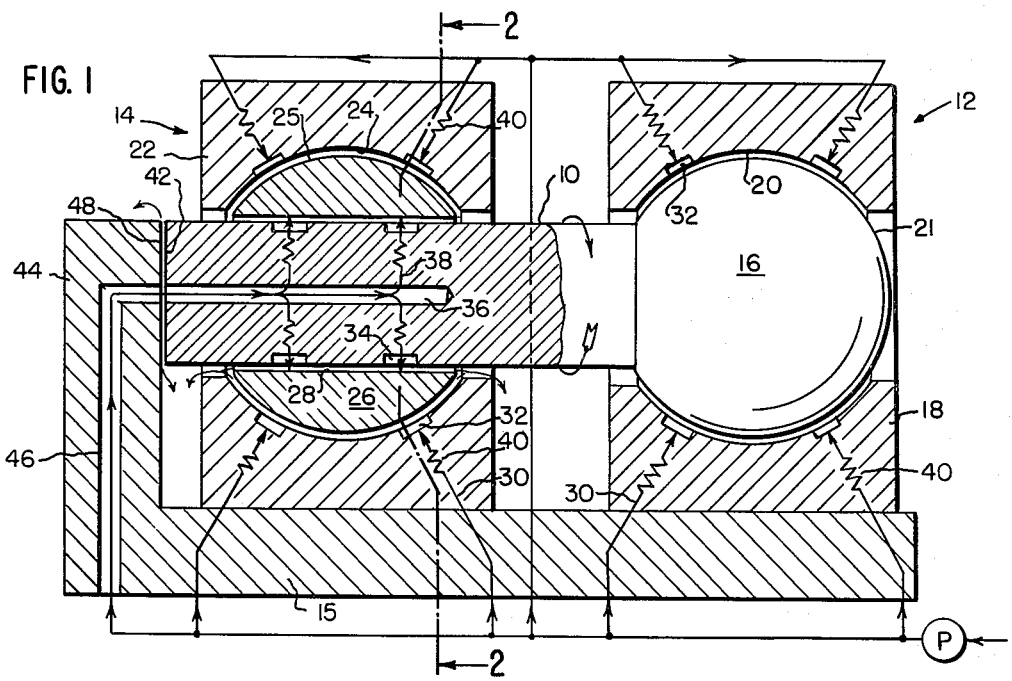
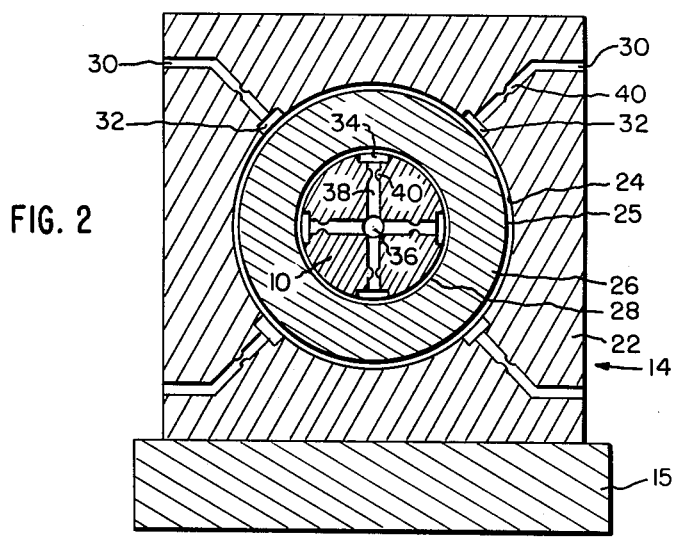
INVENTORS
CALVIN S. MORSER
ROBERT E. MALONEY
CONRAD H. BENOIT
BY
KENWAY, JENNEY, WITTER & HILDRETH
ATTORNEYS Oct. 24, 1961  C. S. MORSER ET AL  3,005,666
HYDROSTATIC ROTARY COUPLING
Filed July 6, 1959  3 Sheets-Sheet 2

INVENTORS
CALVIN S. MORSER
ROBERT E. MALONEY
CONRAD H. BENOIT
BY
KENWAY, JENNEY, WITTER & HILDRETH
ATTORNEYS

United States Patent Office 3,005,666
Patented Oct. 24, 1961

3,005,666
HYDROSTATIC ROTARY COUPLING
Calvin S. Morser, Wellesley, Robert E. Maloney, Stoughton, and Conrad H. Benoit, Dedham, Mass., assignors, by mesne assignments, to Northrop Corporation, Beverly Hills, Cailf., a corporation of California
Filed July 6, 1959, Ser. No. 825,242
5 Claims. (Cl. 308—122)

In a copending application Ser. No. 778,420, filed December 5, 1958, we have disclosed a self-aligning shaft and hydrostatic bearings assembly having large radial and axial load capacities and embodying hydrostatic bearings providing extremely low friction chracteristics and rendering the assembly capable of accommodating marked misalignment. In association with mechanism requiring these extremely low frictional characteristics we were faced with the problem of transmitting hydraulic oil or other liquids from a fixed member to a rotary member, or vice versa, and still retaining the low friction negligible heat generation, and other desirable characteristics disclosed in said application. Various known equipment, commonly called rotary couplings, rotary transfers, rotary joints, etc. are available for this purpose but since all such known couplings possess frictional torques many times in excess of those provided by our hydrostatic bearings, they are wholly unsuitable and unsatisfactory for precision mechanism having the said low friction requirements. In solving this problem we have adapted certain features of our hydrostatic bearings assembly to the providing of a liquid transfer communication between said fixed and rotary members without making any actual contact therebetween that would cause friction, thereby effecting the desired liquid transfer and eliminating the substantial friction induced by rotary couplings heretofore known. The production of a hydrostatic rotary coupling of this nature and for the purpose described comprises the primary object of the invention.

Our novel coupling contemplates the employment of two cooperating and minutely spaced surfaces respectively on the fixed and rotary members together with liquid conducting ports in the members in continuous communication with each other across the space between such surfaces, thereby permitting the transfer of liquid from one member to the other while maintaining substantially free relative rotation of the members. The transfer of liquid can be made either axially or laterally of the rotary axis of the rotary member and our invention contemplates mechanism for effecting such transfer and substantially friction-free relative rotation of the members with minor leakage of liquid at the transfer space between the members. The production of novel mechanism of this nature as and for the purpose described comprises a further object of the invention.

Figure 4:
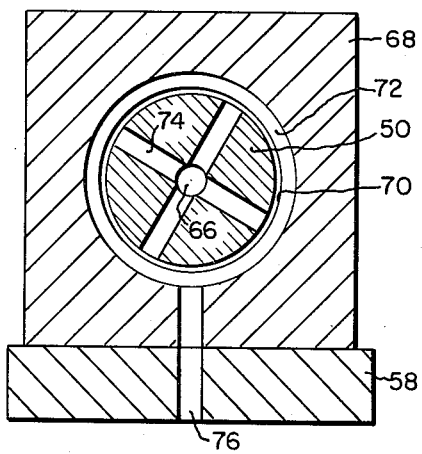
Figure 5:
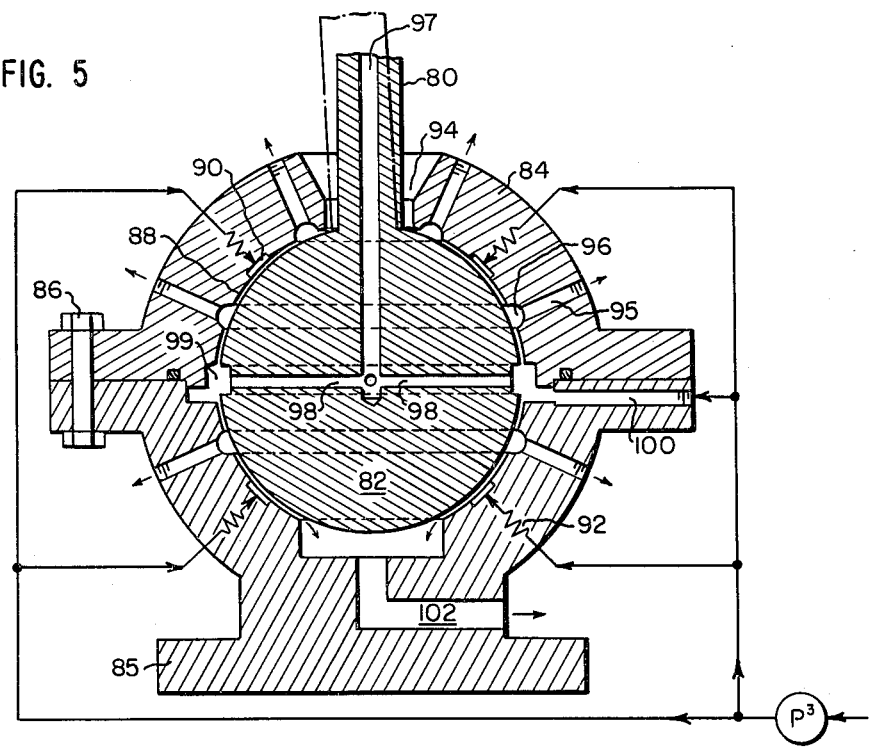

These and other features of the invention will be best understood and appreciated from the following description of certain embodiments thereof, selected for purposes of illustration and shown in the accompanying drawings, in which:

FIG. 1 is a longitudinal sectional view through one embodiment of a hydrostatic rotary coupling comprising our invention, FIG. 2 is a cross section taken on line 2—2 of FIG. 1, FIG. 3 is a view like FIG. 1 but showing a modified construction, FIG. 4 is a cross section taken on line 4—4 of FIG. 3, and FIG. 5 is a view like FIGS. 1 and 3 and showing a further modified construction.

In FIGS. 1 and 2 of the drawings we have illustrated the invention as embodying a heavy steel shaft 10 rotatably supported in spaced hydrostatic bearings at 12 and 14 on a base 15. Both bearings are of the ball and socket type permitting universal angular movement of the shaft in the bearing supports. The bearing 12 includes a spherical head or ball 16 on one end of the shaft 10 and mounted for rotary and universal angular movement within a bearing block 18. The block 18 surrounds the ball 16 and has an internal spherical surface 20 in minutely spaced relation from a like external spherical surface 21 on the ball. The combined units comprise a ball and socket joint supporting the shaft for free rotation and universal angular movement, the bearing 12 thereby functioning as a thrust bearing supporting the shaft against axial movement.

The bearing at 14 is enclosed within a bearing block 22 having an internal spherical surface 24 in minutely spaced relation from a like external spherical surface 25 on an annulus 26 mounted on the shaft. The annulus has an internal cylindrical surface 28 in minutely spaced relation from a like external cylindrical surface on the shaft and permitting relative axial movement of the shaft within the annulus. The combined units comprise a ball and socket joint supporting the shaft for free rotation and universal angular movement within the block 22 and for free rotation and axial movement within the annulus 26.

The shaft is supported in both bearings 12 and 14 on films of oil maintained by controlled pressures and flow rates within the clearance of the spaced bearing surfaces above described, thus effectively floating the shaft on oil with no metal-to-metal contact in the bearings. As thus supported and centrally located within the bearings, the shaft has freedom of rotation and universal angular movement with a minimum of friction, all as hereinafter more specifically described.

Disposed within and through each bearing block 18 and 22 are eight ports or passageways 30 arranged in pairs 90° apart, as illustrated in FIGS. 1 and 2, and disposed equal distances at opposite sides of a plane passing right angularly through the shaft and centrally through the bearing. Each port terminates in a pocket recess 32 at the internal spherical surface of its bearing block. Eight like pockets 34 arranged in like manner are disposed within the shaft at its cylindrical bearing surface within the annulus 26. A port 36 extends axially into the shaft 10 and lateral ports 38 extend therefrom to the pockets 34. Oil is forced through all these ports under controlled pressure and/or metered flows to the spaced spherical and cylindrical surfaces through a circulating system including a pump P and pressure control valves or restrictions 40.

The clearances between the above described and minutely spaced bearing surfaces are extremely small and thus permit slow and generally uniform flow of fluids, such as oil, water, air or other liquids and gases, therethrough under high pressure from the ports 30, 36 and 38. The clearance employed generally ranges between .001 inch and .005 inch depending upon various factors, such as the bearing load, fluid viscosity and the pressures employed. In any event the flow is so controlled and/or metered at opposite sides of the shaft and balls that the resulting pressures at the opposing pockets automatically maintain the shaft and balls centered in their respective bearings.

The centered position of the shaft 10 and spherical members 16 and 26 in the bearings 12 and 14 are maintained by virtue of the fact that the flow control valves at 40 are adjusted normally to provide equal rates of fluid flow to opposite sides of the shaft and balls. Should a variation in external load displace the shaft radially, thus reducing the clearance on one side of the shaft and/or ball and, conversely, increasing the clearance diametrically opposite thereto, the fluid flow through the valves 40 supplying the smaller clearance area will remain constant and result in an increase in the pressure within such area. The increased pressure within the reduced clearance area, including the pocket recesses, thereupon tends to re-center the shaft. Exactly the reverse condition occurs on the opposite side of the shaft wherein the increased clearance area, in which constant fluid flow is maintained, results in reduced pressure within the increased clearance area, thereupon tending to re-center the shaft. Consequently, any load variation applied to the shaft results in pressure variations, both positive and negative, in the annular clearance area which combine and tend automatically to re-center the shaft or balls in their respective bearing bores. The shaft and balls are thus automatically centered in the bearings and in such position they are literally floating on oil with no metal-to-metal contact occurring between the shaft and balls and their bearing bores. Since the only resistance to shaft rotation is the shear of the supporting fluid, the coefficient of friction at relatively low shaft speeds is extremely low and far below that of known rolling element bearings.

The above described hydrostatic bearing assembly is useful in mechanism requiring the extremely low friction efficiency described and this low friction factor must be maintained as otherwise the usefulness of the mechanism for the required purpose would become impaired and render the mechanism wholly unsatisfactory. The provision of supplying oil to the port 36 within the rotary member 10 requires the transfer of oil thereto from a fixed member and a primary object of our invention resides in mechanism for effecting this transfer without impairing the low friction factor described. This mechanism will now be described.

As illutsrated in FIG. 1 the port 36 is disposed axially within the shaft 10 and is open to a plane surface 42 at one end of the shaft. A portion 44 of the fixed base 15 is provided with a port 46 therein in axial alignment with the port 36 across a minutely spaced gap between the surface 42 and a like plane surface 48 on the fixed portion 44. Flow of oil under pressure to the port 46 is provided from the pump P, or from another independent pump if desired, and this oil flow is conducted into the port 36 across the gap without substantial flow loss at the minutely spaced gap. Since there is no metal-to-metal contact at the gap the shaft is free to rotate on the oil film at the gap and which presents no substantial frictional resistance to such rotation. Thus our invention provides for transfer of oil flow to and between the fixed and rotary members without inducing the substantial frictional resistance present in rotary couplings heretofore known and employed for this purpose. While the port 36 is herein illustrated as employed for providing oil flow to the pockets 34 it will be understood that such port or ports and the transfer can be otherwise employed as required.

In FIGS. 3 and 4 we have illustrated a modified construction embodying a shaft 50 supported at its ends in hydrostatic bearing blocks 52 and 54 and having a reduced portion 56 extending outwardly through the block 54. The blocks 52 and 54 are mounted on a base 58 and are provided with cylindrical bearing surfaces 60 in minutely spaced relation from the cylindrical surface of the shaft and plane surfaces 62 in minutely spaced relation from the plane end surfaces of the shaft. Opposed pocket recesses 64 are formed within the surfaces 60 and 62 of the blocks and oil flow is provided thereto from a pump P', the flow being through valves or restrictions at 65 to provide equal rates of flow to opposite sides and ends of the shaft. It will thus be apparent that the shaft is supported for free rotation and against axial movement on films of oil within the gaps between the opposed surfaces.

A port 66 extends axially through the shaft portion 56 and into the portion 50 and our invention provides for a flow of oil or other fluid into and through this port without impairing the extremely low friction characteristics of the assembly. The mechanism illustrated in FIGS. 3 and 4 for performing this function comprises an annulus 68 mounted on the base 58 and surrounding the shaft 50 between the blocks 52 and 54. The annulus is provided with an inwardly facing cylindrical surface 70 in minutely spaced relation from the cylindrical surface of the shaft and with an annular channel 72 therein surrounding the shaft and in communication with ports 74 extending radially of the shaft to its port 66. A port 76 extends through the base 58 and annulus 68 to the channel 72. Connections are provided from the pump P', or independently from a pump $P^2$ for forcing flow of oil through the ports and into the channel 72. Thus our invention provides for transfer of oil flow to and between the fixed and rotary members without causing any substantial resistance to shaft rotation or modifying its low friction characteristics. The oil which oozes outwardly from the minutely spaced surfaces escapes freely as indicated by small arrows in the drawing.

In FIG. 5 we have illustrated a further modified construction embodying a shaft 80 having a spherical member 82 on one end and mounted within bearing blocks 84 and 85 secured together by bolts 86. The two blocks provide a spherical chamber for the member 82 and of such size that the inwardly facing spherical walls 88 of the chamber are in minutely spaced relation from the spherical surface of the member 82. Opposed pocket recesses 90 are formed within the wall surfaces 88 and oil flow is provided thereto from a pump $P^3$ through valves or restrictions at 92. The opposed and equal rates of oil flow thus provided support the member 82 in spaced relation from the surfaces 88 and for free universal rotation on films of oil within the gap between the opposed surfaces. The shaft 80 extends outwardly of the chamber through an opening 94 somewhat larger than the shaft whereby, in addition to its free rotation, the shaft is permitted limited angular movement indicated by broken lines in FIG. 5. Ports 95 and annular channels 96 are provided for the escape of oil oozing outwardly from the minutely spaced surfaces and a furthere escape drain is provided at 102.

A port 97 extends axially through the shaft and to the center of its ball portion 82 and radial ports 98 extend outwardly from the port 97 to an annular channel 90 surrounding the ball member 82. A port 100 extends through the block 85 to the channel 99 and oil flow is provided to the port and channel from the pump $P^3$ or otherwise as may be desired. Thus a flow of oil from the fixed portion 84—85 of the assembly to the rotary portions 80—82 is provided without impairing or reducing the low friction characteristics of the assembly.

While we have herein more particularly illustrated and described our invention in association with hydrostatic bearing assemblies we desire it to be understood that the invention is not limited to such assemblies since it is also applicable to and may be utilized to transfer fluids in various other types of assemblies. Also while we have illustrated and described a metered flow of fluid as required in hydrostatic bearings the invention is also applicable to hydrodynamic rotary couplings and lubrication that requires no external metered supply of pressurized lubricant.

Having thus disclosed and described our invention what we claim as new and desire to secure by Letters Patent of the United States is:

1. A hydrostatic rotary coupling comprising in combination, a shaft, means including a hydrostatic bearing rotatably supporting one portion of the shaft and embodying minutely spaced outwardly and inwardly facing surfaces coaxial with the shaft, means providing a first port in said shaft including a portion terminating at an external surface of another portion of the shaft, said first port further including a portion communicating with said outwardly facing surface, fixed means disposed exteriorly of the shaft and having a surface in minutely spaced relation from said external surface of said shaft, said means disposed exteriorly of said shaft being formed with a second port in direct and continuous communication with said first port across the space between the last named minutely spaced surfaces, and means for supplying a metered flow of fluid to said second port, said second port conducting said metered flow of fluid to said first port for delivery to the space between said outwardly and inwardly facing surfaces.

2. A hydrostatic rotary coupling as recited in claim 1, in which said external surface of said shaft and said surface of said fixed means are radial to the axis of said shaft.

3. A hydrostatic rotary coupling comprising in combination, a shaft, a ball and socket hydrostatic bearing supporting one portion of the shaft and embodying an annulus surrounding said portion of the shaft and a bearing member surrounding said annulus, said bearing member having an internal spherical surface in minutely spaced relation from a like external spherical surface on said annulus, means for supplying a metered flow of fluid to the space between said spherical surfaces for hydrostatically supporting said annulus, said annulus having an internal cylindrical surface disposed in minutely spaced relation about a like external cylindrical surface on said shaft for supporting and permitting relative rotation and axial movement of the shaft within the annulus, said shaft having a first port therein including a bore extending axially of the shaft and communicating with said cylindrical surface on said shaft, fixed means having a surface in minutely spaced relation from a surface of another portion of said shaft, said fixed means formed with a second port in continuous and direct communication with said first port across said surfaces of said fixed means and of said other portion of said shaft, and means for supplying a metered flow of fluid through said second port to said first port and thence to the space between said cylindrical surfaces for hydrostatically supporting said shaft for rotation in said annulus.

4. A hydrostatic rotary coupling as recited in claim 3, in which said surfaces of said fixed means and said other portion of said shaft are radial.

5. The hydrostatic rotary coupling defined in claim 1 plus a ball and socket hydrostatic bearing at the other end of the shaft and supporting the shaft against endwise thrust and for rotary and universal angular movement.

References Cited in the file of this patent

UNITED STATES PATENTS

| | | |
|---|---|---|
| 2,670,146 | Heizer | Feb. 23, 1954 |
| 2,684,272 | Annen | July 20, 1954 |
| 2,696,410 | Topanelian | Dec. 7, 1954 |
| 2,729,106 | Mathiesen | Jan. 3, 1956 |